Patented Oct. 24, 1933

1,932,120

UNITED STATES PATENT OFFICE 1,932,120

ARTIFICIAL GYPSITE

Carlisle K. Roos, Wheaton, and Richard Ericson, Chicago, Ill., assignors to United States Gypsum Company, Chicago, Ill., a corporation of Illinois No Drawing. Application February 8, 1930
Serial No. 427,047

7 Claims. (Cl. 106—34)

This invention relates to plaster compositions and their process of manufacture and has reference more particularly to plaster compositions having characteristics similar to those of natural gypsite. Natural gypsite is an impure form of gypsum containing sand and clay as an impurity. It is usually found in beds near or on top of the earth's surface and is used for making a dark colored plaster. It works very easily and is particularly adapted for use in a warm climate. The natural deposits of gypsite are located in certain localities, and at a considerable distance from the consuming points so that it is necessary to add a considerable freight cost to the cost of manufacture. The natural gypsite has the disadvantage that it carries a high percentage of moisture so that drying is required, thus materially increasing the manufacturing cost. The deposits freeze in the Winter so that they can usually be worked only in the Summer. The natural gypsite has a very slow set because of impurities, such as soluble phosphate, and may require as much as 1½ hours for setting whereas our artificial gypsite will set in 20 to 40 minutes, the usual setting time being 30 minutes. The natural gypsite plaster is manufactured by calcining the gypsite directly from the beds and then screening the calcined material. Since the natural product exists as a fine material in nature, little or no grinding is required in the process, and 70–85% of the resulting plaster will pass through a 100 mesh screen, and has a low consistency of 44–64 cc's.

In order to permit the manufacture of gypsite artificially in any locality near the points of consumption, we have studied the properties of natural gypsite with a view of making same artificially. An object of this invention, therefore, is to provide a plaster composition resembling natural gypsite plaster, together with the method of manufacturing same; also to improve plaster compositions and their methods of manufacture in other respects hereinafter specified and claimed.

The properties desired for our plaster composition are as follows:

1. Good keeping qualities.
2. Good sand-carrying capacity.
3. Light working qualities.
4. Plasticity when used neat, so that it can be spread as a finish.
5. Color as light as possible.
6. Low amount of gauging water required.
7. Very low manufacturing costs.

Our preferred formula for the plaster composition is as follows:

| | | |
|---|---|---|
| Plymouth or reddish brown type clay | 2,960 lbs. | —10% |
| Ground massive gypsum (80% passing 100 mesh screen) | 26,640 lbs. | —90% |

Preferably, but not essentially, eight quarts of 1.4 specific gravity calcium chloride solution or other deliquescent material is added to the kettle containing the above mixture of gypsum and clay, and the mixture is calcined for two and one-half hours, dumping from the kettle at a temperature of 310 to 350° F., preferably 330° F. The calcined mixture, containing first settle calcined gypsum, preferably while still hot, is introduced into a ball or tube mill and ground to a very fine condition. The material may be ball or tube milled in a mill having 5' diameter and a length of 24', the feed being approximately 4 to 6 tons per hour. This milling operation produces a plaster composition having a fineness such that 95–99% will pass a 300 mesh screen, preferably 98%. This screen test was made by washing through the screen with water. The normal consistency of the plaster before ball milling is about 48 cc and after ball milling is about 68 to 76 cc, usually about 72 cc. The purpose of the calcium chloride is to make a plaster of stable characteristics, so that the resulting plaster has a low consistency and a higher strength in the cast produced thereby. The clay used will preferably have the following composition:—

| | Per cent |
|---|---|
| Silica | 60 |
| Alumina | 35 |
| Iron | 4 |
| Magnesite | 1 |

While the above formula produces a very desirable product, somewhat superior plaster compositions can be manufactured by the addition of peat as an ingredient, the resulting plaster having a somewhat higher manufacturing cost but having improved keeping qualities and working qualities with sand.

The complete plaster formula then will have the following composition:

| | Pounds |
|---|---|
| Ground massive gypsum (80% passing 100 mesh screen) | 26,180 |
| Powdered dry peat | 600 |
| Powdered clay | 2,820 |

This mixture is introduced into the standard calcination kettle known to the gypsum industry, and eight quarts of 1.4 specific gravity calcium chlorides solution are preferably added to the kettle, followed by a calcination for two and one-half hours to produce first settle calcined gypsum, dumping from the kettle at a temperature of 310 to 350° F., preferably 330° F. The resulting mixture is ball milled or tube milled at the rate of 5 tons per hour in a 5′ x 24′ ball mill, one fourth full of balls, the mixture being hot or cold as desired. This milling operation produces a plaster composition having a fineness such that 95 to 99% will pass a 300 mesh screen.

Instead of ordinary clay, shale may be used, preferably shale which does not contain oil. The ball milling of the final product with the ingredients in intimate admixture, is very important since the large amount of ultrafine material produced by the ball milling improves the sand-carrying capacity, the plasticity, the resistance to aging and facilitates mixing of colors, if colors are used. The addition of the calcium chloride also decreases the stickiness of the resulting plaster when mixed with water, thus more nearly resembling the natural gypsite. The feed in the above described ball mill may be varied from 4 to 6 tons per hour, but 5 tons per hour is considered the best practice. A ball milling at the rate of 4 tons per hour will give a total estimated ball milling of the material of about 48 minutes.

Another form of the process which might be used is to make a 90% gypsum and 10% clay mix in the form of a wet slurry and this slurry is permitted to set, the mixture, however, being stirred throughout the set. After drying, the mixture is calcined in the regular manner, and ground, and the product used in place of natural gypsite. The plaster so made is very light and fluffy in working qualities, is extremely plastic and keeps well. If the proper colored clay is chosen, the color will be satisfactory. However, the additional cost of drying the mix after the initial setting, together with the further grinding somewhat increases the manufacturing cost.

We would state in conclusion that while the illustrated examples constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:—

1. A plaster composition resembling natural gypsite, comprising a ball-milled mixture of a major proportion of calcined gypsum and a minor proportion of clay, together with a trace of a deliquescent substance.

2. A plaster composition resembling natural gypsite, comprising a ball-milled mixture of calcined gypsum, clay and peat, together with a trace of deliquescent chloride.

3. A plaster composition resembling natural gypsite, comprising clay and calcined gypsum finely ground as a mixture to insure intimate admixture of ultra-fine material, the clay constituting approximately 10% of the mixture.

4. A plaster composition resembling natural gypsite, comprising a finely ground mixture of shale and calcined gypsum, the shale constituting approximately 10% of the composition, together with a trace of calcium chloride.

5. The method of manufacturing plaster, which comprises calcining a mixture of gypsum, powdered peat and shale, and ball-milling the hot mixture to a fineness such that 95 to 99% passes through a 300 mesh screen.

6. The method of manufacturing plaster, which comprises calcining a homogeneous mixture of powdered gypsum, clay and peat, together with a trace of calcium chloride, removing the material from the calcining zone at a temperature of approximately 330° F., and ball-milling the hot product to a fineness such that 95 to 99% passes through a 300 mesh screen.

7. The method of manufacturing plaster, which comprises calcining a homogeneous mixture of powdered clay and gypsum, the clay being approximately 10% of the mixture, adding a trace of a deliquescent chloride prior to calcination, and ball-milling the resulting product while still hot from the calcination to a fineness such that 95 to 99% passes through a 300 mesh screen.

CARLISLE K. ROOS.
RICHARD ERICSON.